July 16, 1957     T. W. KOONS     2,799,128
RECEPTACLE FILLING GUIDE
Filed June 28, 1954
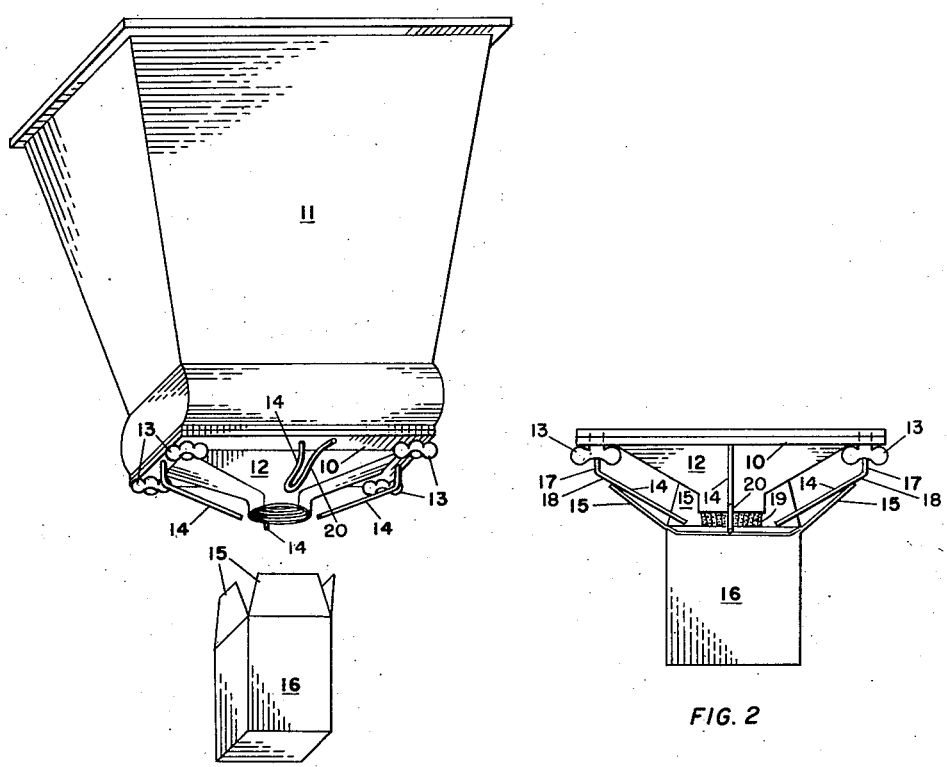
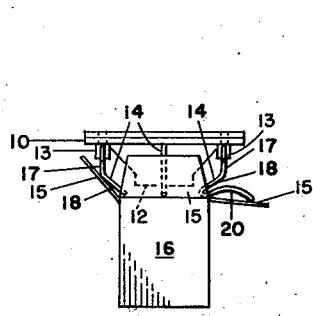
FIG. 1
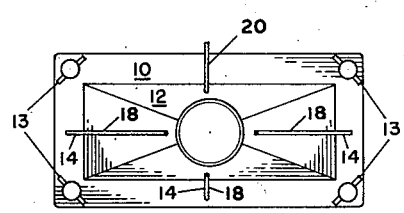
FIG. 2
FIG. 3
FIG. 4
Inventor
THOMAS W. KOONS
By Lamont Johnston
Attorney

2,799,128
RECEPTACLE FILLING GUIDE

Thomas W. Koons, Chattanooga, Tenn.

Application June 28, 1954, Serial No. 439,777

11 Claims. (Cl. 53—381)

This invention relates to a guide for filling receptacles, and more particularly to a guide which will maintain the cover open while the receptacle is being filled.

Heretofore, receptacles, particularly collapsible containers, have been filled with difficulty and with an unnecessary expenditure of time because the covers or flaps attached to the receptacles have had to be spread open by hand. This is particularly true in the ice cream industry where containers are manually placed beneath the spout of the filling machine and the flaps are manually held against the sides of the container to prevent obstruction of the ice cream pouring into the container. Since the filling machines are capable of operating faster, a need has arisen for a device for automatically spreading the flaps while the containers are being filled. Although guides of various types have been developed for other types of filling machines, they are not adapted to fit the conventional ice cream filling machine.

An object of the invention is to overcome the disadvantages enumerated and to provide a simple, inexpensive guide for spreading receptacle flaps so that filling such receptacles can be accomplished more easily, quickly and sanitarily.

Another object of the invention is to provide a receptacle filling guide which will allow the mouth of the receptacle to be positioned in close proximity to the pouring spout.

Another object of the invention is to provide a guide which will spread at least one of the receptacle flaps to a substantially horizontal position to allow visibility of the pouring operation.

A further object of the invention is to provide a guide which will not damage the flaps when the receptacle is applied rapidly to the filling machine.

Further objects and advantages of the invention will be apparent from the following description taken in conjunction with the drawings wherein, Fig. 1 is a perspective of a guide attached to an ice cream filling machine before the container is applied;

Fig. 2 is a side elevation of the invention engaging the container;

Fig. 3 is an end elevation of the invention engaging the container; and

Fig. 4 is a bottom plan view.

Briefly stated, the invention comprises a plate having an aperture therethrough to fit around the throat of the filling spout of a dispenser such as an ice cream filling machine. Depending from the periphery of the frame are a plurality of guide fingers which slope downward and inward toward the path of the material to be poured from the spout. These fingers slope so that the mouth of the receptacle to be filled, such as an ice cream container, may be positioned as close as possible to the pouring spout. Attached to at least one of the sloping depending fingers is a wing guide which is curved so that its contour is concave downward. This particular contour enables the flap of the receptacle to be received and forced outwardly to an approximately horizontal position to afford visibility of the filling operation. The contour of the guide is also such that at any point on the guide where the edge of the flap is received, the flap will not be perpendicular at that point and consequently will slide easily and smoothly out and away from the pouring material.

Referring now to the drawings in more detail, the plate 10 is attached to the filling device 11 about the throat of the filling spout 12 by adequate securing means 13 such as wing nuts as shown in Fig. 1. Depending from the plate 10 are a plurality of guide fingers 14 generally sloping downward and inward to receive and spread outwards the flaps 15 of a receptacle or container 16, as shown in Figs. 2 and 3. A portion 17 of the finger 14 is perpendicular to the plate 10 and of sufficient length to allow the ends of the flaps 15 of the container 16 to clear the securing means 13 and avoid any buckling or other damage to the flaps when the container engages the guide. The portion 18 of the guide finger 14 slopes downward toward but just short of the path of the pouring material 19. The slope is such that when the container 16 engages the fingers 14, the mouth of the container will be spaced close to the filling spout 12 to prevent unnecessary spattering and noise, but not so close as to allow the spout to enter the container and become clogged when the container is filled.

At least one of the guide fingers 14 is provided with a wing guide 20 which may be an extension of the finger portion 18 as shown in Fig. 3, or it may be otherwise secured to the finger 14. The structure of the wing guide 20 is immaterial so long as its bottom contour is concave downward to receive the thrust of and to force outward the flap of a container without damaging the flap. The wing guide 20 forces the flap to a position below the plane of the container mouth thus affording visibility of the material 19 pouring from the spout 12 into the container 16 as shown in Fig. 2. The wing guide 20 is designed so that the inside of the flap 15 will always engage the wing guide 20 at any point at an acute angle so that the upward force will cause the edge of the flap 15 to slide outward along the bottom of the wing guide 20 without buckling or otherwise becoming damaged. Neither the fingers 14 nor the wing guides 20 will extend into the path of the pouring material 19.

This invention provides for a more sanitary and more rapid method of filling containers and in particular, filling ice cream containers. In actual use on an ice cream filling machine, this device has already doubled the output of the operation.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. An attachment for a machine for filling an ice cream container having a plurality of flaps, said attachment comprising a plate having an aperture therethrough for receiving the spout of the machine, means for securing the plate to the machine, a plurality of fingers depending from the plate sloping downward and inward, the outer sloping portion of the fingers spaced from the plate and below the lower extremities of the securing means, means associated with said fingers for positioning at least one flap below the plane of the mouth of the container.

2. The invention according to claim 1 in which the means for positioning at least one flap below the plane of the mouth of the container comprises a surface concave downward.

3. A receptacle filling guide for spreading the flaps on a receptacle, comprising a plurality of fingers sloping downward and inward, at least one of which is provided with a concave flap engaging surface.

4. A receptacle filling guide for spreading the flaps on a receptacle, comprising a plurality of fingers sloping downward and inward and peripherally spaced so that every flap may be engaged by a finger, and means associated with at least one finger for positioning the flap to be engaged below the plane of the receptacle mouth.

5. An attachment for fitting about the throat of a filling spout for the purpose of spreading the flaps on a receptacle to be filled, comprising guide members sloping downward and inward, at least one of said guide members being a wire finger the outer portion of which is curved concave downward.

6. An attachment for fitting about the throat of a filling spout for the purpose of spreading the flaps on a receptacle to be filled, comprising a plurality of depending wire guide fingers sloping downward and inward, the outer portion of at least one of said fingers being curved concave downward.

7. The invention according to claim 6 in which the curved outer portion forms an acute angle with the inside surface of the flap it spreads.

8. A receptacle filling guide for spreading the flaps on a receptacle, comprising a plurality of fingers sloping downward and inward and peripherally spaced so that every flap may be engaged by a finger, at least one of said fingers being of wire and having an outward and downward extending curved flap engaging portion.

9. The invention according to claim 8 in which the curved portion of the wire finger forms an acute angle with the inside surface of the flap it spreads.

10. The invention according to claim 8 in which the curved flap engaging portion is a continuation of the wire finger.

11. An attachment for fitting about the throat of a filling spout for the purpose of spreading the flaps on a receptacle to be filled, comprising a plurality of depending wire guide fingers sloping downward and inward, at least one of said fingers depending vertically from the throat for a small portion of its length, then sloping downward and inward to a point outside of the path of material dispensed from said spout, then reversing its direction and through the greater portion of its length, curving upward, outward and then downward.

References Cited in the file of this patent

UNITED STATES PATENTS

| | | |
|---|---|---|
| 1,887,751 | Colver | Nov. 15, 1932 |
| 2,037,484 | Raymer et al. | Apr. 14, 1936 |
| 2,409,626 | Harrington et al. | Oct. 22, 1946 |
| 2,437,117 | Orstrom | Mar. 2, 1948 |